US012715081B2

(12) United States Patent
Bandoh et al.

(10) Patent No.: US 12,715,081 B2
(45) Date of Patent: Aug. 25, 2026

(54) PROCESSING MACHINE, CONTROL DEVICE FOR PROCESSING MACHINE AND CONTROL METHOD FOR PROCESSING MACHINE

(71) Applicant: Komatsu Ltd., Tokyo (JP)

(72) Inventors: Kenichi Bandoh, Tokyo (JP); Natsuki Itou, Tokyo (JP); Mohammad Munzir, Tokyo (JP)

(73) Assignee: Komatsu Ltd., Tokyo (JP)

( * ) Notice: Subject to any disclaimer, the term of this patent is extended or adjusted under 35 U.S.C. 154(b) by 74 days.

(21) Appl. No.: 18/728,514

(22) PCT Filed: Feb. 2, 2023

(86) PCT No.: PCT/JP2023/003410

§ 371 (c)(1),
(2) Date: Jul. 12, 2024

(87) PCT Pub. No.: WO2023/149507

PCT Pub. Date: Aug. 10, 2023

(65) Prior Publication Data

US 2025/0153355 A1 May 15, 2025

(30) Foreign Application Priority Data

Feb. 3, 2022 (JP) ................................ 2022-015574

(51) Int. Cl.

*B24B 49/12* (2006.01)
*B25J 9/16* (2006.01)
*G05B 19/4093* (2006.01)

(52) U.S. Cl.

CPC ............ *B24B 49/12* (2013.01); *B25J 9/1664* (2013.01); *B25J 9/1697* (2013.01);

(Continued)

(58) Field of Classification Search

CPC ....... B25J 9/1664; B25J 9/1697; B24B 49/12; G05B 19/4093; G05B 19/4097;

(Continued)

(56) References Cited

U.S. PATENT DOCUMENTS 4,337,566 A 7/1982 DiMatteo et al.
5,751,584 A 5/1998 Yuasa et al.

(Continued)

FOREIGN PATENT DOCUMENTS

CN 111360851 B * 1/2021 ........... B25J 9/1664
JP H01-155403 A 6/1989

(Continued)

*Primary Examiner* — Spencer D Patton
(74) *Attorney, Agent, or Firm* — Fish & Richardson P.C.

(57) ABSTRACT

A processing machine includes a tool configured to perform machine processing on a workpiece, and a depth camera configured to be installed such that the workpiece lies within an imaging range and to capture a depth of a subject. A position measurement unit calculates a three-dimensional position of a surface of the workpiece based on a depth image captured by the depth camera. A position matching unit, based on three-dimensional data representing a target shape of the workpiece and a three-dimensional position of the workpiece, calculates a three-dimensional position of the target shape in a case in which the workpiece and the target shape are superimposed. A cutting amount determination unit determines a cutting amount at each of a plurality of points on the surface of the workpiece based on a difference in a line-of-sight direction between the three-dimensional position of the surface of the workpiece and a three-dimensional position of a surface of the target shape in a case in which the workpiece is viewed from a predetermined viewpoint. A tool control unit moves the tool based on the determined cutting amount.

5 Claims, 7 Drawing Sheets

(52) U.S. Cl.
CPC .................... *G05B 19/4093* (2013.01); *G05B 2219/37554* (2013.01); *G05B 2219/37564* (2013.01); *G05B 2219/40564* (2013.01); *G05B 2219/40607* (2013.01)

(58) Field of Classification Search
CPC ...... G05B 19/4099; G05B 2219/37554; G05B 2219/37555; G05B 2219/37558–37565; G05B 2219/37567; G05B 2219/40562; G05B 2219/40564; G05B 2219/40607; G05B 2219/40604
See application file for complete search history.

(56) References Cited

U.S. PATENT DOCUMENTS

| | | | | |
|---|---|---|---|---|
| 2022/0040884 | A1* | 2/2022 | Sprecher | B25J 13/08 |
| 2024/0261975 | A1* | 8/2024 | Azuma | B25J 9/1664 |

FOREIGN PATENT DOCUMENTS

| | | | | |
|---|---|---|---|---|
| JP | H08-052638 | A | | 2/1996 |
| JP | H11-138388 | A | | 5/1999 |
| JP | 2001-264047 | A | | 9/2001 |
| JP | 2013-107144 | A | | 6/2013 |
| JP | 2014075050 | A | * | 4/2014 |
| JP | 6253847 | B | | 12/2017 |

* cited by examiner 900
901
PROCESSOR
902
MAIN MEMORY
903
STORAGE
904
INTERFACE

PROCESSING MACHINE, CONTROL DEVICE FOR PROCESSING MACHINE AND CONTROL METHOD FOR PROCESSING MACHINE

CROSS-REFERENCE TO RELATED APPLICATIONS

This application is a National Stage application under 35 U.S.C. § 371 of International Application No. PCT/JP2023/003410, filed on Feb. 2, 2023, which claims priority to Japanese Patent Application No. 2022-015574, filed on Feb. 3, 2022. The contents of the prior applications are incorporated herein in their entirety.

TECHNICAL FIELD

The present disclosure relates to a processing machine, a control device for a processing machine, and a control method for a processing machine.

BACKGROUND ART

A control device for a processing machine reads a processing program used for processing a workpiece and drives the processing machine by executing the program to cut the workpiece into a desired shape. Patent Document 1 discloses a technology of superimposing and displaying a processing trajectory by a processing program on a camera image obtained by capturing a workpiece.

CITATION LIST

Patent Document

[Patent Document 1]
Japanese Patent No. 6253847

SUMMARY OF INVENTION

Technical Problem

It is not easy to prepare a processing program for processing a workpiece. Even in a case where the processing program is created based on a target shape of the workpiece and is executed by an actual processing machine, a cutting error occurs due to characteristics of the processing machine. Therefore, an operator needs to create the processing program by correcting the processing program while repeating the pre-processing of the workpiece.

An object of the present disclosure is to provide a processing machine, a control device for a processing machine, and a control method for a processing machine capable of processing a workpiece without preparing a processing program.

Solution to Problem

According to an aspect of the present disclosure, there is provided a processing machine including a tool configured to perform machine processing on a workpiece, a depth camera configured to be installed such that the workpiece lies within an imaging range and to capture a depth of a subject, a position measurement unit configured to calculate a three-dimensional position of a surface of the workpiece based on a depth image captured by the depth camera, a position matching unit configured, based on three-dimensional data representing a target shape of the workpiece and a three-dimensional position of the workpiece, to calculate a three-dimensional position of the target shape in a case in which the workpiece and the target shape are superimposed, a cutting amount determination unit configured to determine a cutting amount at each of a plurality of points on the surface of the workpiece based on a difference in a line-of-sight direction between the three-dimensional position of the surface of the workpiece and a three-dimensional position of a surface of the target shape in a case in which the workpiece is viewed from a predetermined viewpoint, and a tool control unit configured to move the tool based on the determined cutting amount.

Advantageous Effects of Invention

According to the above aspect, a workpiece can be processed without preparing a processing program.

DESCRIPTION OF EMBODIMENTS

First Embodiment

<<Configuration of Processing Machine 1>>

Hereinafter, an embodiment of the present invention is described in detail with reference to the drawings.

Figure 1:
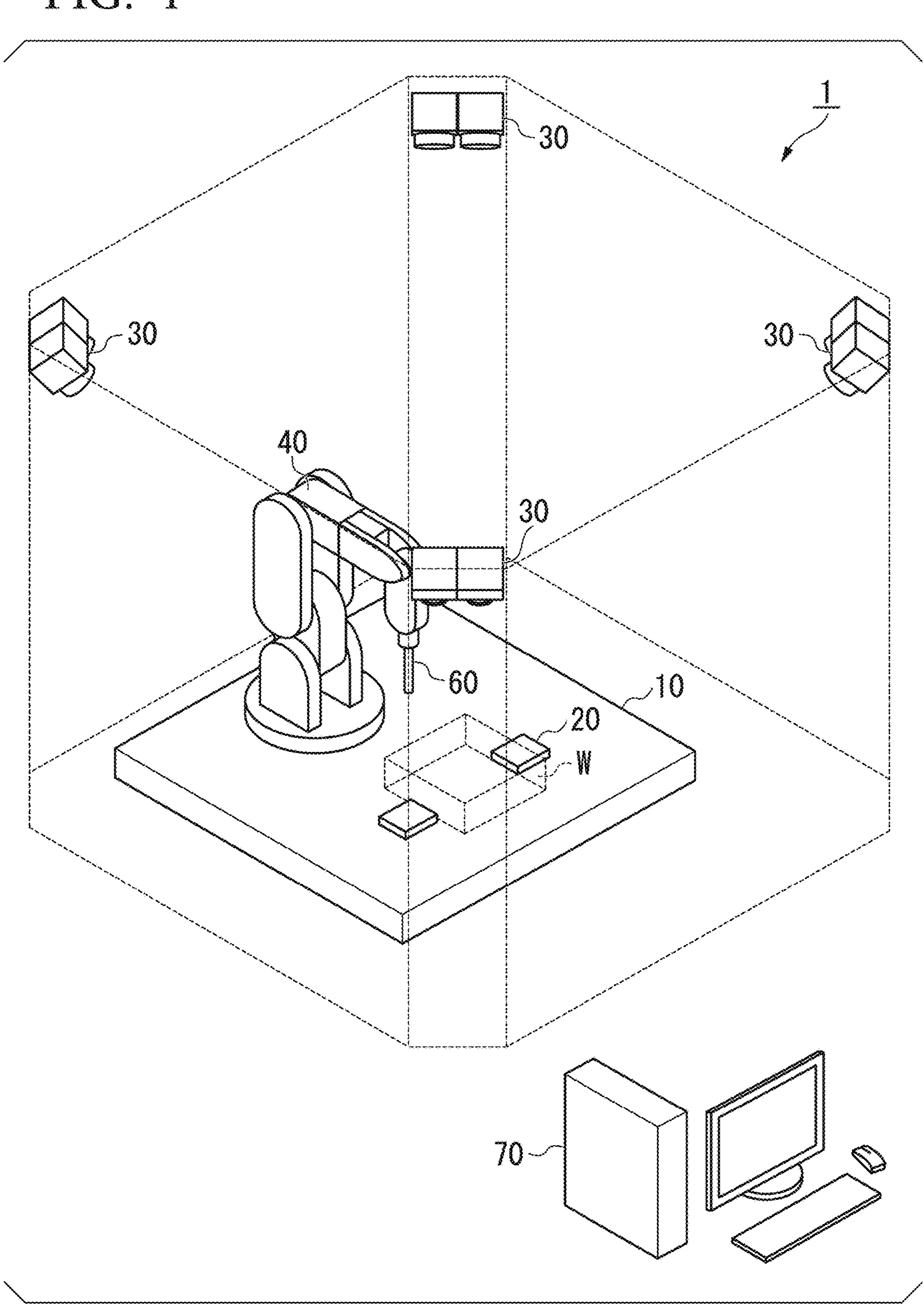
FIG. 1 is a perspective view of a processing machine according to a first embodiment.

FIG. 1 is a perspective view of a processing machine according to a first embodiment. The processing machine 1 includes a table 10, a jig 20, a plurality of stereo cameras 30, a robot arm 40, a tool 60, and a control device 70. In another embodiment, the processing machine 1 may be, for example, a machining center.

The table 10 is a base of the processing machine 1. The jig 20 is provided on the table 10. The jig 20 supports the workpiece W by sandwiching a workpiece W.

The stereo camera 30 captures a depth image of a subject included in an imaging range. The stereo camera 30 is an example of a depth camera. The stereo camera 30 is provided such that an imaging range includes an installation area of the workpiece W. The stereo camera 30 is installed, for example, on an inner wall of the processing machine 1 to overlook the table 10. It is preferable that the stereo camera 30 is fixed by a jig made of a material that is unlikely to cause thermal expansion such that a relative position with respect to the table 10 does not change. The plurality of stereo cameras 30 are disposed to compensate each other's blind spots. In the example shown in FIG. 1, the processing machine 1 includes the four stereo cameras 30 and can capture the depth image from four directions. It is noted that, in another embodiment, the number of the stereo cameras 30 may be one or a plurality. In addition, the depth image may be measured from two directions or one direction instead of the four directions. The stereo camera 30 is attached to four corners of a ceiling of a substantially rectangular parallelepiped housing that covers the processing machine 1. It is noted that, since it may be sufficient that the stereo camera 30 is fixed to the processing machine 1, the present disclosure is not limited to the housing, and for example, the stereo camera 30 may be fixed to four columns.

Figure 2:
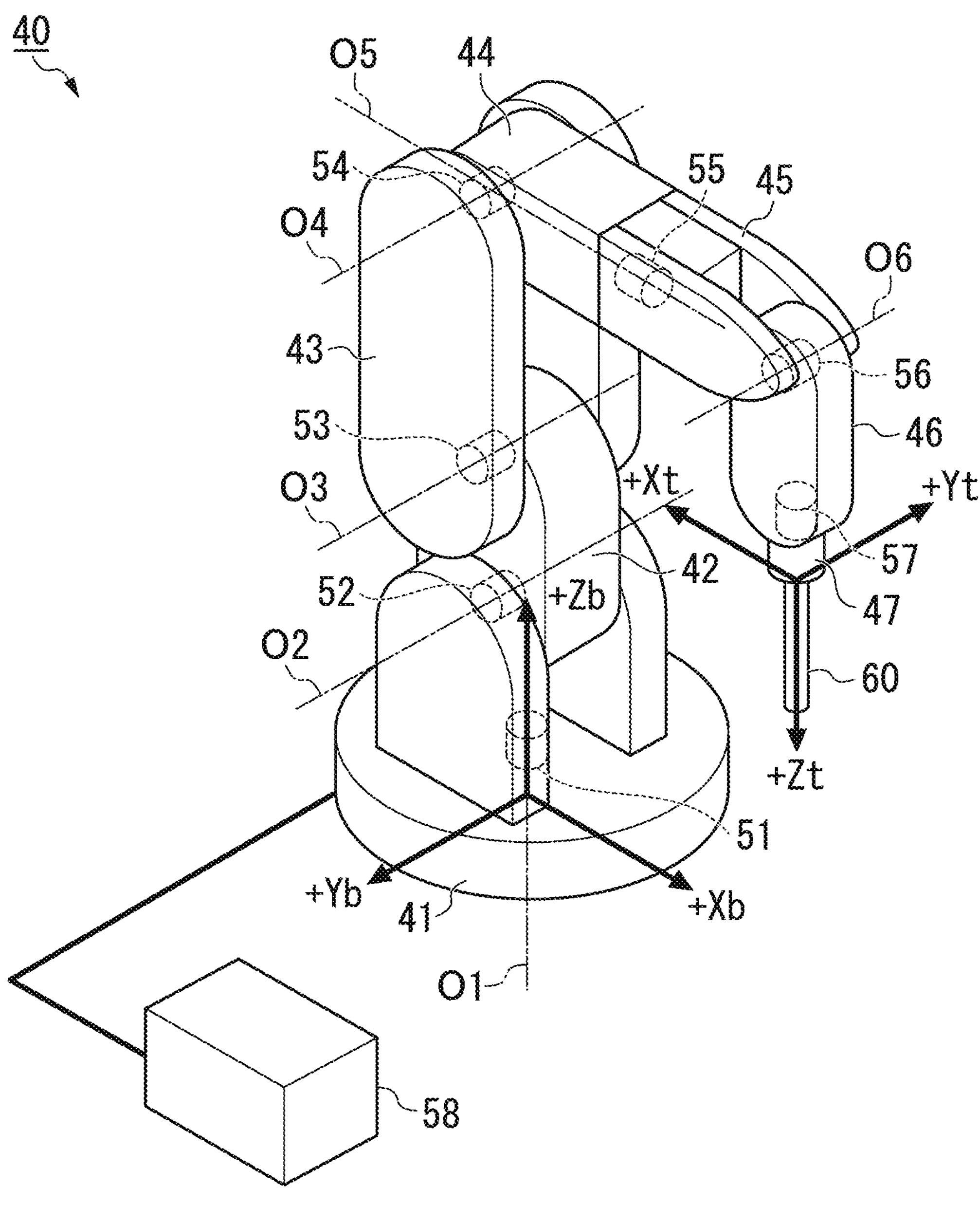
FIG. 2 is a perspective view showing a configuration of a robot arm according to the first embodiment.

FIG. 2 is a perspective view showing a configuration of a robot arm 40 according to the first embodiment. The robot arm 40 movably supports the tool 60. The tool 60 is supported by a distal end of the robot arm 40. The tool 60 cuts the workpiece W. In addition, in another embodiment, the tool 60 may grind the workpiece W. The robot arm 40 may be, for example, a 6-axis vertical articulated robot. The robot arm 40 includes a base 41, a first arm 42, a second arm 43, a third arm 44, a fourth arm 45, a fifth arm 46, and a spindle 47. The base 41 is fixed to be rotatable around a first axis O1 extending in an up-down direction with respect to the table 10. The first arm 42 is connected to be rotatable around a second axis O2 orthogonal to the first axis O1. The second arm 43 is connected to the first arm 42 to be rotatable around a third axis O3 parallel to the second axis O2. The third arm 44 is connected to be rotatable around a fourth axis O4 parallel to the third axis O3. The fourth arm 45 is connected to the third arm 44 to be rotatable around a fifth axis O5 extending in the axial direction of the third arm 44. The fifth arm 46 is connected to the fourth arm 45 to be rotatable around a sixth axis O6 orthogonal to the fifth axis O5. The spindle 47 is provided at a distal end of the fifth arm 46 and rotatably supports the tool 60.

The robot arm 40 includes a first motor 51, a second motor 52, a third motor 53, a fourth motor 54, a fifth motor 55, a sixth motor 56, and a seventh motor 57. The first motor 51 rotates the base 41. The second motor 52 rotates the first arm 42 with respect to the base 41. The third motor 53 rotates the second arm 43 with respect to the first arm 42. The fourth motor 54 rotates the third arm 44 with respect to the second arm 43. The fifth motor 55 rotates the fourth arm 45 with respect to the third arm 44. The sixth 25 motor 56 rotates the fifth arm 46 with respect to the fourth arm 45. The seventh motor 57 rotates the spindle 47. In addition, an encoder (not shown) is provided in each motor to measure the rotation angle of each arm.

The robot arm 40 includes a driver 58. The driver 58 drives each motor of the robot arm 40 in accordance with a control instruction. The driver 58 calculates the position and the posture of the distal end of the spindle 47 based on the rotation angle measured by the encoder. The driver 58 specifies the position and the posture of the spindle 47 in a base coordinate system and a tool coordinate system. The base coordinate system is a coordinate system having a center of a bottom surface of the base 41 as an origin, and is represented by a Zb axis extending in an up-down direction, and an Xb axis and a Yb axis orthogonal to the Zb axis. The tool coordinate system is a coordinate system having a distal end of the spindle 47 as an origin, and is represented by a Zt axis extending in an axial direction of the spindle 47, and an Xt axis and a Yt axis orthogonal to the Zt axis. In a case where the driver 58 receives the coordinate axis and the control instruction indicating the movement amount related to the parallel movement or the rotation, the driver 58 calculates the angle of each motor for moving the spindle 47 by the movement amount indicated by the control instruction along the coordinate axis indicated by the control instruction, and controls each motor. In addition, in a case where the driver 58 receives the coordinate system and the control instruction indicating the position and the posture in the coordinate system, the driver 58 calculates the angle of each motor for moving the spindle 47 to the position indicated by the control instruction and controls each motor.

The control device 70 controls the robot arm 40 based on the depth image captured by the stereo camera 30 and the position of the distal end of the robot arm 40.

<<Configuration of Control Device 70>>

Figure 3:
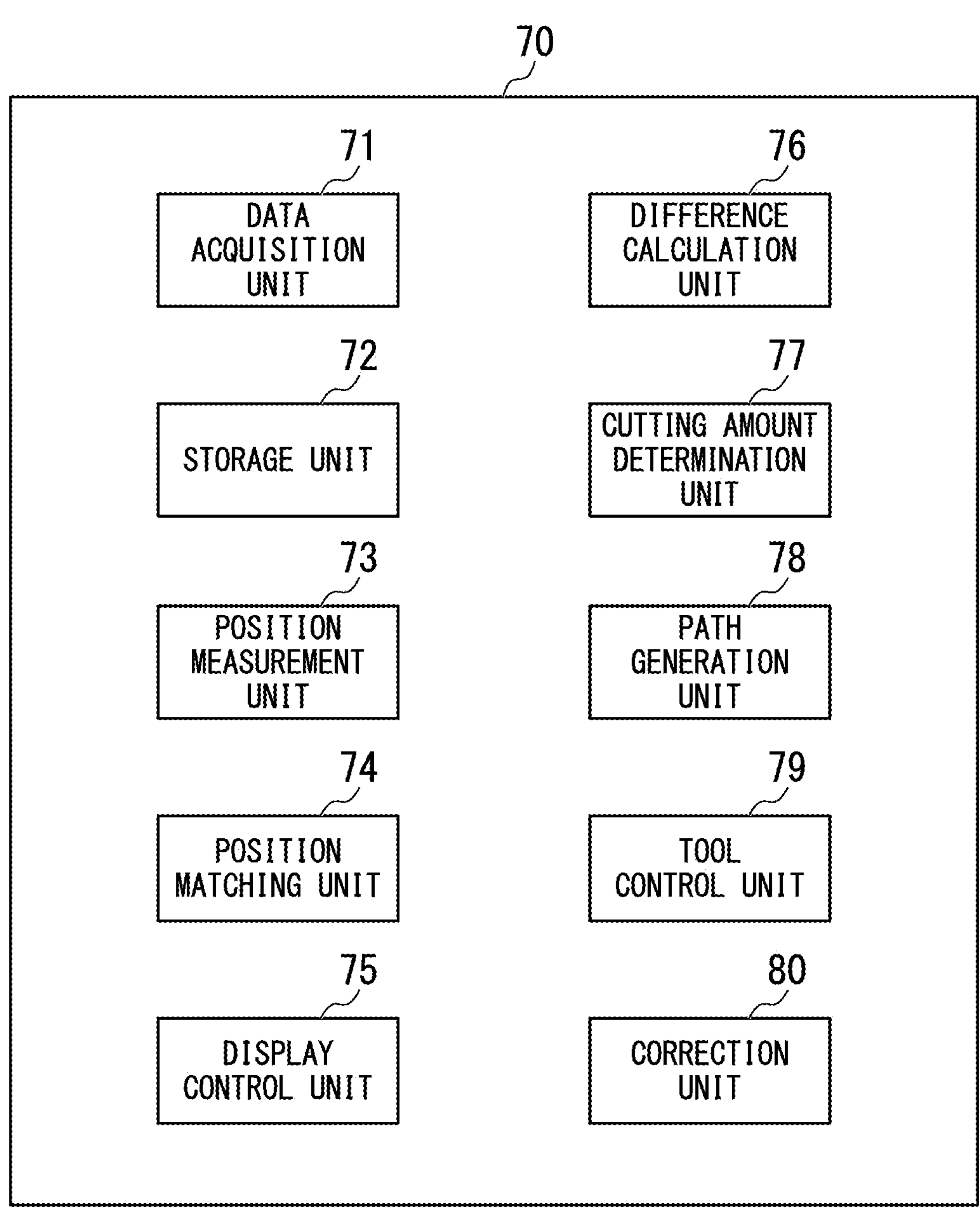
FIG. 3 is a schematic block diagram showing a configuration of a control device according to the first embodiment.

FIG. 3 is a schematic block diagram showing a configuration of the control device 70 according to the first embodiment.

The control device 70 includes a data acquisition unit 71, a storage unit 72, a position measurement unit 73, a position matching unit 74, a display control unit 75, a difference calculation unit 76, a cutting amount determination unit 77, a path generation unit 78, a tool control unit 79, and a correction unit 80.

The data acquisition unit 71 acquires the depth image from the stereo camera 30 and acquires the measurement value of the angle of each arm from the robot arm 40. The depth image is obtained by associating a depth indicating a distance from the camera with each pixel constituting an image captured by one camera of the stereo cameras 30, which is the main camera.

The storage unit 72 stores tool data that is three-dimensional data indicating the shape of the tool 60, matching data that is three-dimensional data indicating the shape of the workpiece W before the processing, and target data that is three-dimensional data indicating the target shape of the workpiece W. The tool data, the matching data, and the target data may be, for example, CAD data. It is noted that the target data is created and recorded by an operator who operates the processing machine 1. In addition, the storage unit 72 stores the position and the posture of the stereo camera 30 in the base coordinate system.

The position measurement unit 73 specifies a three-dimensional position of the workpiece W based on the depth image acquired from the stereo camera 30. Specifically, the position measurement unit 73 according to the first embodiment specifies the three-dimensional position of the workpiece W by the following procedure. First, the position measurement unit 73 generates point group data in the base coordinate system based on the depth image generated by the at least one stereo camera 30 and the position and the posture of the stereo camera 30 in the base coordinate system. Next, the position measurement unit 73 performs matching of the point group data with the matching data stored in the storage unit 72. The position measurement unit 73 can perform matching by, for example, an ICP algorithm. As a result, the position measurement unit 73 specifies the position and the posture of the matching data in the base coordinate system as the three-dimensional position of the workpiece W.

The position matching unit 74 disposes the target data stored in the storage unit 72 at the three-dimensional position of the workpiece W measured by the position measurement unit 73. That is, the position matching unit 74 determines the position and the posture of the target shape of the workpiece W in the base coordinate system represented by the target data. The position matching unit 74 generates a depth image corresponding to the stereo camera 30 from the position-matched target shape. That is, the position matching unit 74 generates the depth image obtained in a case where the target shape of the workpiece W is projected from the viewpoint of the stereo camera 30 based on the position and the posture in the base coordinate system of the stereo camera 30 stored in the storage unit 72 and the position and the posture in the base coordinate system of the target shape. Hereinafter, the depth image generated by the position matching unit 74 is referred to as a target depth image. The position matching unit 74 is an example of a target depth calculation unit that calculates a depth of a surface of the target shape with respect to the stereo camera 30 based on a three-dimensional position of the target shape.

Figure 4:
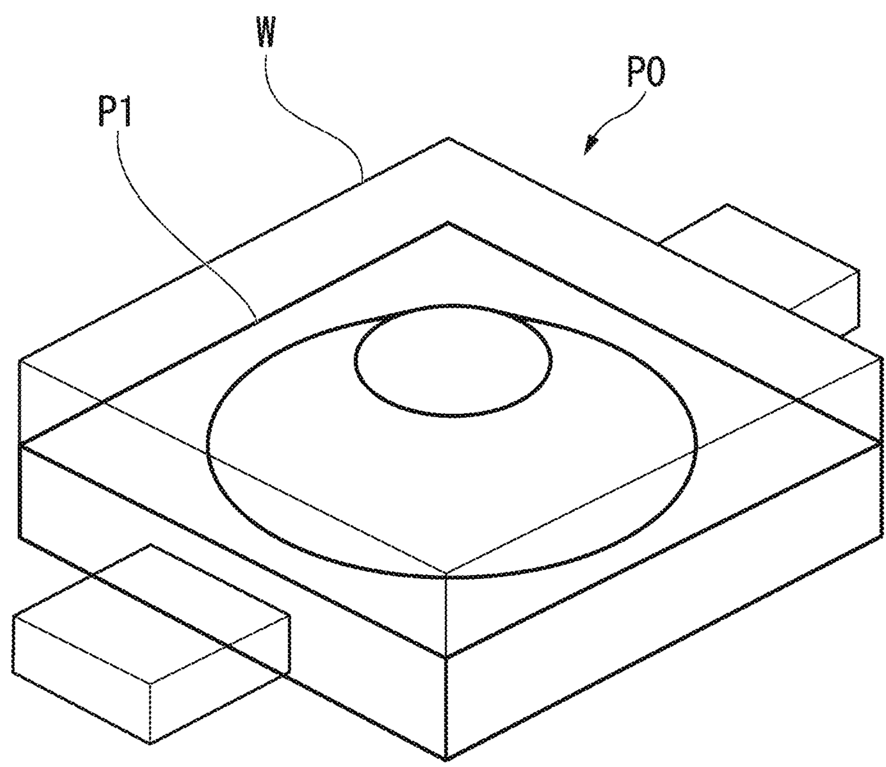
FIG. 4 is an example of a display screen according to the first embodiment.

The display control unit 75 renders a target image P1 representing the target shape of the workpiece W as viewed from one camera that is the main camera for each of the stereo cameras 30 based on the target depth image generated by the position matching unit 74. The target image P1 may be, for example, a line drawing obtained by outline rendering of a three-dimensional model or a translucent image. The display control unit 75 displays a display screen on which the image (a captured image P0) captured by the stereo camera 30 and the target image P1 corresponding to the stereo camera 30 are superimposed, on the display. FIG. 4 is an example of a display screen according to the first embodiment. It is noted that the display control unit 75 may not have to display the position matching or the like on the display screen. As shown in FIG. 4, the target image P1 is displayed to be included in the workpiece W captured in the captured image P0. The captured image P0 may be an image obtained by combining images captured by the four stereo cameras 30.

The difference calculation unit 76 calculates a depth difference for each pixel between the depth image acquired by the stereo camera 30 and the target depth image generated by the position matching unit 74.

The cutting amount determination unit 77 determines the cutting amount at a position corresponding to each pixel in the workpiece W based on the depth difference of each pixel and the maximum cutting amount of the tool 60. The pixel of the workpiece W represents a point on the surface of the workpiece W. Specifically, the cutting amount determination unit 77 determines the cutting amount by the following procedure.

First, the cutting amount determination unit 77 specifies the maximum value of the depth difference calculated by the difference calculation unit 76. The cutting amount determination unit 77 determines an expected scan number by adding 1 to the integer part of the value obtained by dividing the maximum value of the depth difference by the maximum cutting amount. It is noted that, in another embodiment, the expected scan number may be determined by using a predetermined cutting amount smaller than the maximum cutting amount set in advance by the operator instead of the maximum cutting amount. The expected scan number is the number of scans until the cutting is completed when the workpiece W can be cut as planned. It is noted that the actual scan number does not always match the expected scan number due to the influence of the control error of the robot arm 40, the bending of the tool 60, or the like. The cutting amount determination unit 77 determines the cutting amount at a position corresponding to the pixel of which the depth difference is equal to or larger than the maximum cutting amount, to be the maximum cutting amount. The cutting amount determination unit 77 determines the cutting amount at a position corresponding to the pixel of which the depth difference is less than the maximum cutting amount, to be an amount obtained by dividing the depth difference by the scan number. As a result, for the position corresponding to the pixel of which the depth difference is less than the maximum cutting amount, highly accurate cutting can be realized by repeating the cutting at a small cutting amount. In another embodiment, the cutting amount determination unit 77 may determine the cutting amount at the position corresponding to each pixel by another method. For example, the cutting amount determination unit 77 according to another embodiment may determine the cutting amount by dividing the depth difference by the scan number regardless of the magnitude of the depth difference. In addition, the cutting amount determination unit 77 according to another embodiment may determine the cutting amount at a position corresponding to the pixel of which the depth difference is less than the maximum cutting amount, to be the cutting amount corresponding to the depth difference.

It is noted that the cutting amount determination unit 77 may thin out the pixel of the depth image and calculate the cutting amount only for the remaining pixel. In this case, the cutting amount determination unit 77 may calculate the cutting amount by interpolation using a moving average for the thinned-out pixel.

The path generation unit 78 determines a path that is a movement path of the distal end of the tool 60 based on the depth image acquired from the stereo camera 30 and the cutting amount determined by the cutting amount determination unit 77. The path generation unit 78 determines the position of the distal end of the tool 60 at the time of cutting by adding the cutting amount determined by the cutting amount determination unit 77 to the depth of each pixel of the depth image, and determines a path of the tool 60 in accordance with a predetermined path planning algorithm. Exemplary examples of the path planning algorithm include a Dijkstra method, an A* method, a PRM method, an RRT method, and an RRT* method. The path generation unit 78 may generate a smooth path by interpolating the position of the distal end of the tool 60 with an NURBS curve.

The tool control unit 79 generates a movement instruction to be output to the driver 58 of the robot arm 40 such that the tool is moved in accordance with the path generated by the path generation unit 78. First, in order to match the posture of the tool 60 (the rotation angle about each axis in the base coordinate system) with the posture of the stereo camera 30, the tool control unit 79 generates a movement instruction to rotate the tool 60 based on the posture of the stereo camera 30 stored in the storage unit 72 and transmits the movement instruction to the driver 58. It is noted that, when the tool 60 is matched with the posture of the stereo camera 30, it is preferable to match the posture of the tool 60 with the posture of one camera of the stereo camera 30, which is the main camera. As a result, the driver 58 matches the posture of the spindle 47 of the robot arm 40 with the posture of the stereo camera 30. As a result, the direction in which the tool 60 faces matches the line-of-sight direction of the stereo camera 30. That is, the direction in which the Zt axis of the tool coordinate system extends matches with a depth direction of the depth image.

Thereafter, the tool control unit 79 generates a movement instruction based on the path generated by the path generation unit 78 and transmits the movement instruction to the driver 58. In this case, the tool control unit 79 corrects the position in the Zt-axis direction to a position in front of the position of the distal end of the tool 60 indicated by the path by the length of the tool 60. It is noted that the initial posture of the tool 60 matches the posture of the stereo camera 30, but, in a case where the tool 60 is moved along the path, the posture of the tool 60 may change depending on a processing surface.

The correction unit 80 corrects a deviation between the instruction of the tool control unit 79 and the processing position of the robot arm 40 after one path of cutting by the tool control unit 79. Specifically, the correction unit 80 searches for a deviation amount $d_x$ in the Xb axis direction and a deviation amount $d_y$ in the Yb axis direction for which the sum of absolute differences (SAD) indicated by Expression (1) shown below is minimized.

[Formula 1]

$$SAD(d_x, d_y) = \sum_{x=0}^{h-1}\sum_{y=0}^{w-1}\left|\frac{I(x+d_x, y+d_y)}{p(x, y)+\delta} - 1\right| \quad (1)$$

In Expression (1), x is an Xb axis component in the base coordinate system, and y is a Yb axis component in the base coordinate system. h is a length in an Xb axis direction of the minimum rectangle including the path, and w is a length in the Yb axis direction of the minimum rectangle including the path. p(x,y) is a cutting instruction amount at a position (x,y) in the base coordinate system. δ is a constant for preventing division by zero. I(x,y) is a depth difference at a position (x,y) between a depth image captured before processing and a depth image captured after processing, that is, the actual cutting amount. Since $d_x$ and $d_y$ that minimize the SAD in Expression (1) represent a deviation between the instruction of the tool control unit 79 and the processing position of the robot arm 40, the correction unit 80 corrects a control deviation by subtracting the calculated deviation amount from a subsequent movement instruction. It is noted that, in order to prevent excessive cutting, the correction unit 80 may add a significantly large penalty value to the SAD when there is a portion at which the actual cutting amount is larger than the cutting instruction amount.

<<Control of Processing Machine 1>>

Figure 5:
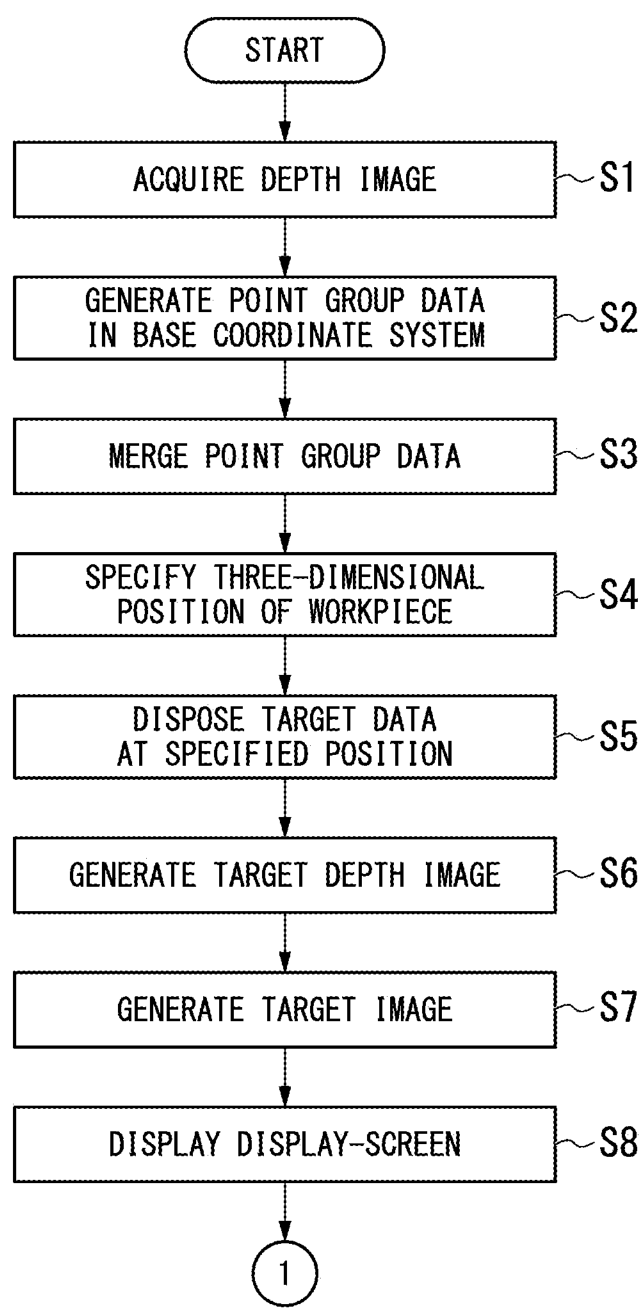
FIG. 5 is a flowchart (part 1) showing a control method for a processing machine by the control device according to the first embodiment.
Figure 6:
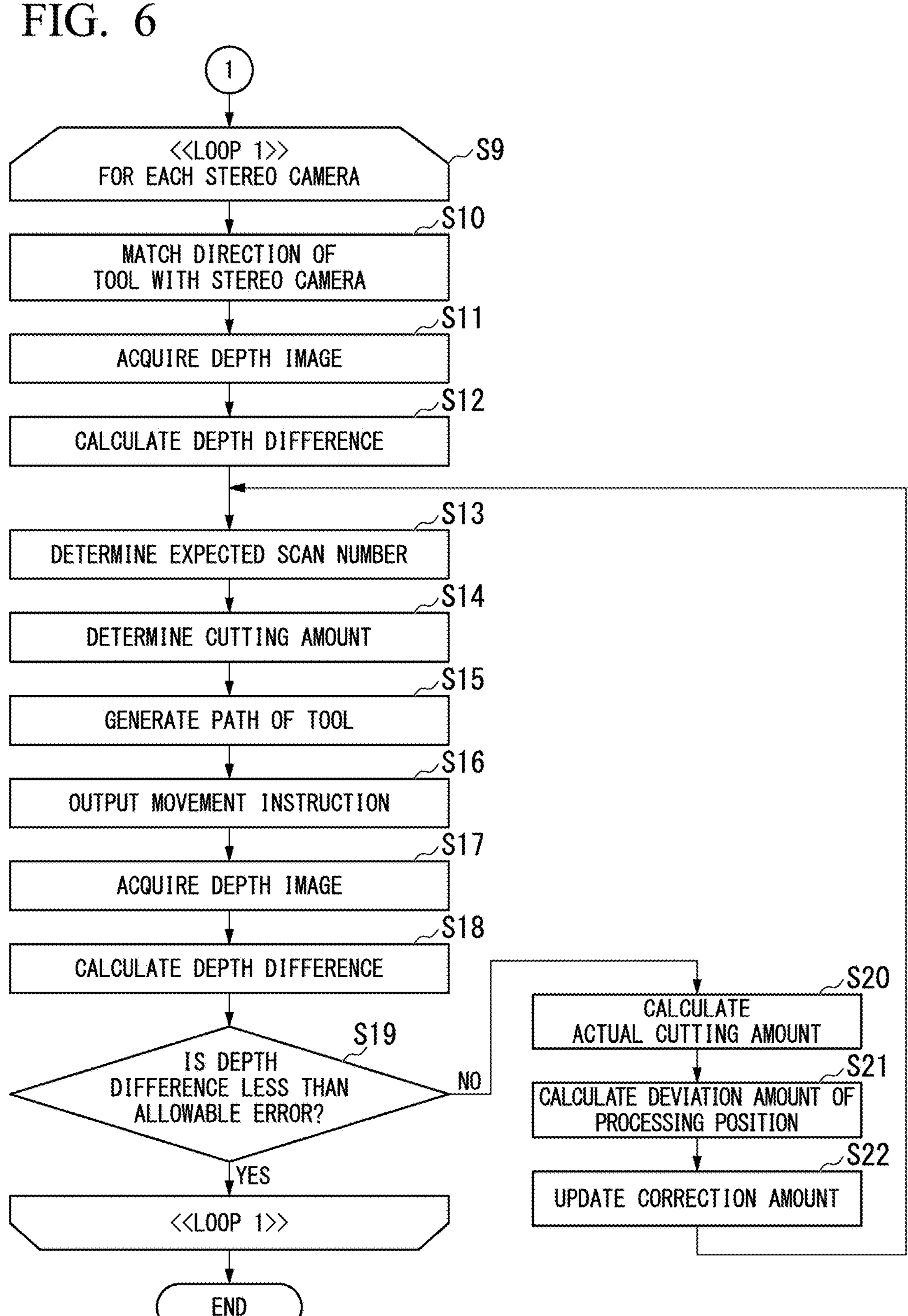
FIG. 6 is a flowchart (part 2) showing the control method for a processing machine by the control device according to the first embodiment.

FIG. 5 is a flowchart (part 1) showing a control method for the processing machine 1 by the control device 70. FIG. 6 is a flowchart (part 2) showing the control method for the processing machine 1 by the control device 70. In a case where the operator installs the workpiece W on the table 10, records the target data in the storage unit 72, and inputs an instruction of processing start, the control device 70 starts the processing of the workpiece W.

First, the data acquisition unit 71 acquires the depth image from the stereo camera 30 (step S1). Next, the position measurement unit 73 generates the point group data in the base coordinate system based on the depth image generated by the stereo camera 30 and the position and the posture of the stereo camera 30 stored in the storage unit 72 in the base coordinate system (step S2). The position measurement unit 73 merges the generated four point group data (step S3).

The position measurement unit 73 specifies the three-dimensional position of the workpiece W by performing matching of the merged point group data with the matching data stored in the storage unit 72 (step S4). Next, the position matching unit 74 disposes the target data stored in the storage unit 72 at the three-dimensional position of the workpiece W specified in the step S4 in a virtual space (step S5). Next, the position matching unit 74 generates a target depth image corresponding to the stereo camera 30 from the position-matched target shape (step S6). The position matching unit 74 records the generated target depth image in the storage unit 72.

The display control unit 75 renders a target image showing the target shape of the workpiece W viewed from one camera of the stereo camera 30 based on the target depth image corresponding to the stereo camera 30 generated in the step S6 (step S7). The display control unit 75 records the generated target image in the storage unit 72. The display control unit 75 displays a display screen on which the image captured by one camera of the stereo camera 30 and the target image generated in the step S6 are superimposed, on the display (step S8). Hereinafter, each time the display control unit 75 acquires the image captured by the stereo camera 30 at a certain frame rate, the display control unit 75 superimposes the image on the target image stored in the storage unit 72 to update the display screen, and displays the updated display screen on the display. As a result, the operator can compare the shape of the workpiece W with the target shape in real time.

Next, the control device 70 selects the stereo camera 30 one by one (step S9), and executes processes from the following step S10 to step S22.

The tool control unit 79 reads the posture of the stereo camera 30 selected in the step S9 from the storage unit 72, generates a movement instruction to match the posture of the spindle 47 in the base coordinate system with the posture of the stereo camera 30, and transmits the movement instruction to the driver 58. That is, the tool control unit 79 matches the direction in which the tool 60 faces with the line-of-sight direction of the stereo camera 30 (step S10).

Next, the data acquisition unit 71 acquires a new depth image from the stereo camera 30 selected in the step S9 (step S11). Next, the difference calculation unit 76 calculates a depth difference for each pixel between the depth image acquired in the step S11 and the target depth image corresponding to the stereo camera 30 selected in the step S9 (step S12).

Next, the cutting amount determination unit 77 determines the expected scan number by adding 1 to the integer part of the value obtained by dividing the maximum value of the calculated depth difference by the maximum cutting amount of the tool 60 (step S13). The cutting amount determination unit 77 determines the cutting amount at the position corresponding to each pixel of the depth image based on the depth difference, the maximum cutting amount of the tool 60, and the expected scan number (step S14). Specifically, the cutting amount determination unit 77 determines the cutting amount at a position corresponding to the pixel of which a depth difference is equal to or larger than the maximum cutting amount, to be the maximum cutting amount. The cutting amount determination unit 77 determines the cutting amount at a position corresponding to the pixel of which the depth difference is less than the maximum cutting amount, to be the amount obtained by dividing the depth difference by the maximum cutting amount.

The path generation unit 78 generates a path of the tool 60 based on the depth image and the cutting amount determined by the cutting amount determination unit 77 (step S15). When the correction amount is recorded in the storage unit 72, the path generation unit 78 corrects the path based on the correction amount. Next, the tool control unit 79 generates a movement instruction for moving the tool in accordance with the path generated in the step S15 and outputs the movement instruction to the driver 58 of the robot arm 40 (step S16). As a result, the robot arm 40 moves the tool in accordance with the path to cut the workpiece.

Next, the data acquisition unit 71 acquires a new depth image from the stereo camera 30 selected in the step S9 (step S17). Next, the difference calculation unit 76 calculates a depth difference for each pixel between the depth image acquired in the step S17 and the target depth image corresponding to the stereo camera 30 selected in the step S9 (step S18).

The control device 70 determines whether or not the depth difference of all the pixels is less than a predetermined allowable error (step S19). When the depth difference of at least one pixel is not less than the predetermined allowable error (step S19: NO), the control device 70 determines to continue the cutting of the surface imaged by the stereo camera 30 selected in the step S9.

When the cutting is continued, for each pixel of the depth image, the correction unit 80 calculates the actual cutting amount at the position corresponding to the pixel by obtaining a depth difference between the depth image used for generating the path and the newly acquired depth image (step S20). Next, the correction unit 80 searches for the deviation amount of the processing position by using the above-mentioned Expression (1) based on the cutting instruction amount indicated by the instruction outputted to the driver 58 in the step S16 and the actual cutting amount (step S21). The correction unit 80 updates the correction amount by adding the obtained deviation amount to the correction amount stored in the storage unit 72 (step S22). It is noted that, when the correction amount is not recorded in the storage unit 72, the correction unit 80 records the obtained deviation amount in the storage unit 72 as the correction amount. Then, the control device 70 returns the process to the step S13, and performs the cutting again based on the depth image acquired in the step S17 and the depth difference calculated in the step S18.

When the depth difference of all the pixels is less than the predetermined allowable error (step S19: YES), the control device 70 selects the next stereo camera 30 and executes the processes from the step S10 to the step S22.

When the processes from the step S10 to the step S22 are completed for all the stereo cameras 30, the control device 70 determines that the processing of the workpiece W is ended, and ends the processes. That is, when a difference from the target shape is less than the allowable error as viewed from the plurality of stereo cameras 30 provided to compensate for the blind spot, the control device 70 ends the processing of the workpiece W.

Actions and Effects

As described above, the processing machine 1 according to the first embodiment performs the processing on the workpiece W according to the following procedure. The control device 70 calculates the three-dimensional position of the surface of the workpiece W based on the depth image captured by the stereo camera 30. The control device 70 calculates a three-dimensional position of the target shape in a case where the workpiece W and the target shape are superimposed, based on the target data representing the target shape of the workpiece W and the three-dimensional position of the workpiece W. The control device 70 determines the cutting amount at each of the plurality of points on the surface of the workpiece W based on a difference in a line-of-sight direction between a three-dimensional position of the surface of the workpiece W and a three-dimensional position of the surface of the target shape in a case where the workpiece W is viewed from the viewpoint of the stereo camera 30. The control device 70 moves the tool 60 based on the determined cutting amount.

As a result, the processing machine 1 according to the first embodiment can automatically control the tool 60 based on the depth image and the target data without the operator preparing the processing program.

In addition, the control device 70 of the processing machine 1 according to the first embodiment calculates the depth of the surface of the target shape with the stereo camera 30 as a reference based on the three-dimensional position of the target shape, and determines the cutting amount based on the depth of the workpiece W in the depth image and the calculated depth of the target shape. As a result, in order to determine the cutting amount, the processing machine 1 according to the first embodiment may not need to convert the depth image into the three-dimensional data each time the cutting is advanced. Specifically, in a case where the control device 70 generates the point group data once in the step S2 shown in FIG. 5, the control device 70 does not need to generate the point group data in a loop from the step S9 to the step S22 or in a loop from the step S13 to the step S22 in the selected stereo camera 30. The target shape of the workpiece W does not change from the start of processing to the end of processing. Therefore, in a case where the control device 70 generates the target depth image before the processing and records the generated target depth image in the storage unit 72 in the step S8, the target depth image recorded in the storage unit 72 is used in the calculation of the depth difference in the step S12 and the step S18 that are subsequent, so that the conversion from the target data to the target depth image can be omitted. It is noted that the three-dimensional data is data representing positions of a plurality of points in a three-axis Cartesian coordinate system. The point group data is an example of the three-dimensional data. The depth image is data in which the depth is associated with each point on the two-dimensional plane. The depth does not necessarily intersect the two-dimensional plane because the depth represents the distance from a viewpoint of the camera.

Since the calculation amount in the conversion from the depth image to the three-dimensional data is large, the processing machine 1 can quickly perform the processing of the workpiece W by reducing the calculation of the three-dimensional data by the above procedure. In addition, since the three-dimensional data has a large capacity, it is necessary to secure a large storage area in the storage unit 72, but by using the depth image instead of the three-dimensional data as in the first embodiment, the data amount can be suppressed. It is noted that, in another embodiment, although the calculation amount is increased, the depth difference may be calculated by using three-dimensional data instead of the depth image.

In addition, the control device 70 of the processing machine 1 according to the first embodiment determines the cutting amount for each pixel on the surface of the workpiece W again based on a difference between the three-dimensional position of the surface of the workpiece W after the workpiece W is cut by the tool 60 and the three-dimensional position of the surface of the target shape. As described above, the control device 70 can always recognize an error between an actual shape and a target shape by recalculating the shape of the workpiece W each time of cutting, and can perform the cutting of the workpiece W while reducing the error.

Another Embodiment

The embodiments have been described above in detail with reference to the drawings; however, the specific configurations are not limited to the above-described configurations, and various design changes or the like can be made.

That is, in another embodiment, the order of the above-described processing may be appropriately changed. In addition, some of the processing may be executed in parallel.

The control device 70 according to the above-described embodiment may be configured by a single computer, or the configuration of the control device 70 may be disposed to be divided into a plurality of computers, and the plurality of computers may function as the control device 70 by cooperating with each other. In this case, the control device 70 may have a part of the function of the driver 58 of the robot arm 40, or the driver 58 may have a part of the function of the control device 70.

The processing machine 1 according to the embodiment described above includes the stereo camera 30 as the depth camera, but the present disclosure is not limited thereto. For example, in another embodiment, a TOF camera, a LiDAR, a three-dimensional scanner, or the like may be used as the depth camera. In addition, in another embodiment, the processing machine 1 may include a plurality of single cameras instead of the stereo camera 30, perform stereo matching processing on captured images of two adjacent cameras among the plurality of single cameras, and be used as the stereo camera.

It is noted that, in another embodiment, the processing machine 1 may include only one depth camera. For example, the processing machine 1 according to another embodiment may include the depth camera immediately above the workpiece W, and may perform the processing while directing the tool 60 in a line-of-sight direction of the depth camera. In addition, in another embodiment, the depth camera may be a combination of a camera and a depth measurement device.

In addition, the control device 70 according to the embodiment described above generates the path of the tool without converting the depth image by aligning the direction of the tool 60 to the line-of-sight direction of the stereo camera 30, but the present disclosure is not limited thereto. For example, the control device 70 according to another embodiment may convert a line-of-sight direction of the depth image into a direction of the tool 60 to determine the cutting amount and to create the path. For example, the control device 70 according to another embodiment may convert the line-of-sight direction of the depth image into a vertical downward direction to determine the cutting amount and to create the path. In this case, the converted depth image is represented by a three-axis Cartesian coordinate system. In addition, the calculation amount is increased in another embodiment, but the three-dimensional data may be generated from the depth image to determine the cutting amount. When the depth image is converted, the arm that supports the tool 60 may not have a high degree of freedom as in the robot arm 40. For example, the arm may be configured to move the tool 60 in parallel without changing the angle of the tool 60.

In addition, the control device 70 according to the embodiment described above specifies the three-dimensional position of the workpiece W based on the matching data indicating the shape of the workpiece W before the processing, but the present disclosure is not limited thereto. For example, the control device 70 according to another embodiment may specify the three-dimensional position of the workpiece W by a difference between the depth image before the workpiece W is installed and the depth image after the workpiece W is installed. In addition, in another embodiment, since the portion of the workpiece W held by the jig 20 is not processed, the specification of the three-dimensional position of the workpiece W and the position matching of the target data may be performed by matching the shape (surface, side, or the like) of the held portion of the workpiece W with the shape of the held portion of the target data. In addition, in another embodiment, the operator may perform the position matching manually.

In addition, the control device 70 according to the embodiment described above performs cutting until the depth difference of the depth image captured by the one stereo camera 30 is less than the allowable error, and then performs cutting based on the next stereo camera 30, but the present disclosure is not limited thereto. For example, in another embodiment, the control device 70 may switch the target stereo camera 30 each time cutting of one path is performed. That is, the control device 70 according to another embodiment may perform the determination of whether or not the processing of the step S19 is ended after performing the processes from the step S10 to the step S18 for all the stereo cameras 30.

<Computer Configuration>

Figure 7:
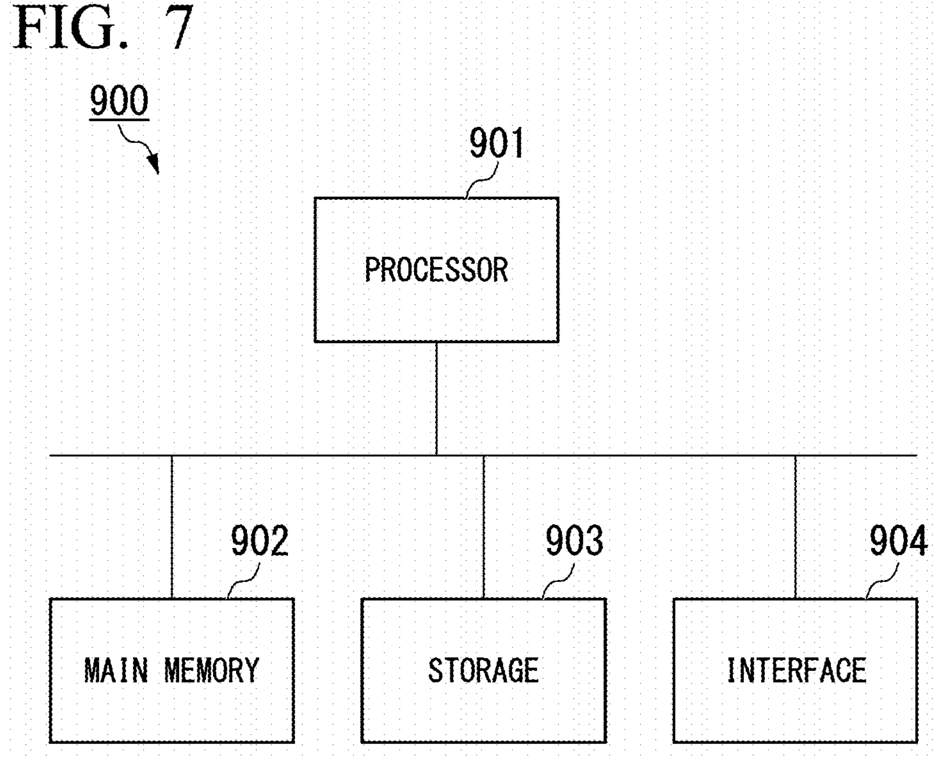
FIG. 7 is a schematic block diagram showing a configuration of a computer according to at least one embodiment.

FIG. 7 is a schematic block diagram showing a configuration of a computer according to at least one embodiment.

A computer 900 includes a processor 901, a main memory 902, a storage 903, and an interface 904.

The control device 70 described above is mounted on the computer 900. Then, an operation of each of the above-described processing units is stored in the storage 903 in a form of a program. The processor 901 reads the program from the storage 903, loads the program in the main memory 902, and executes the processing in accordance with the program. In addition, the processor 901 secures a storage area corresponding to each of the storage units described above in the main memory 902 in accordance with the program. Exemplary examples of the processor 901 include a central processing unit (CPU), a graphic processing unit (GPU), and a microprocessor.

The program may be used for realizing some of functions of the computer 900. For example, the program may function in combination with another program already stored in the storage or in combination with another program implemented in another device. It is noted that, in another embodiment, the computer 900 may include a custom large scale integrated circuit (LSI), such as a programmable logic device (PLD), in addition to the configuration described above or instead of the configuration described above. Exemplary examples of the PLD include a programmable array logic (PAL), a generic array logic (GAL), a complex programmable logic device (CPLD), and a field programmable gate array (FPGA). In this case, a part or all of the functions realized by the processor 901 may be realized by an integrated circuit. Such an integrated circuit is also included as an example of the processor.

As the storage 903, magnetic disks, optical-magnetic disks, optical disks, semiconductor memories, or the like are exemplary examples. The storage 903 may be an internal medium directly connected to the bus of the computer 900, or may be an external medium connected to the computer 900 through the interface 904 or a communication line. In addition, when this program is delivered to the computer 900 through a communication line, the computer 900 receiving the delivered program may load the program in the main memory 902 and execute the above processing. In at least one embodiment, the storage 903 is a non-transitory tangible storage medium.

In addition, the program may be for realizing some of the above-described functions. Further, the program may be a so-called differential file (differential program) that realizes the above-described function in combination with other programs already stored in the storage 903.

INDUSTRIAL APPLICABILITY

According to the above aspect, a workpiece can be processed without preparing a processing program.

What is claimed is:

1. A processing machine comprising:
a tool configured to perform machine processing on a workpiece;
a depth camera configured to be installed such that the workpiece lies within an imaging range and to capture a depth of a subject; and
one or more processors configured to:
calculate a depth of a surface of the workpiece based on a depth image captured by the depth camera,
calculate, based on three-dimensional data representing a target shape of the workpiece and a three-dimensional position of the workpiece, a three-dimensional position of the target shape in a case in which the workpiece and the target shape are superimposed,
calculate a depth of a surface of the target shape with respect to the depth camera based on the three-dimensional position of the target shape,
determine a cutting amount at each of a plurality of points on the surface of the workpiece based on a depth difference in a line-of-sight direction between the depth of the surface of the workpiece and the depth of the surface of the target shape in a case in which the workpiece is viewed from a predetermined viewpoint,
match a processing direction of the tool with an imaging direction of the depth camera, and
move the tool based on the determined cutting amount.

2. The processing machine according to claim 1, wherein the one or more processors are configured to:
determine a cutting amount at a point at which the depth difference between the surface of the workpiece and the surface of the target shape exceeds a maximum cutting amount of the tool, to be a maximum amount; and
determine a cutting amount at a point at which the depth difference between the surface of the workpiece and the surface of the target shape does not exceed the maximum cutting amount of the tool, to be an amount obtained by dividing the depth difference between the surface of the workpiece and the surface of the target shape by a predetermined number.

3. The processing machine according to claim 1, wherein the one or more processors are configured to:
determine the cutting amount at each of the plurality of points on the surface of the workpiece again based on the depth difference between the depth of the surface of the workpiece and the depth of the surface of the target shape after the workpiece is processed by the tool.

4. A control device for a processing machine including a tool configured to perform machine processing on a workpiece, a depth camera configured to be installed such that the workpiece lies within an imaging range and to capture a depth of a subject, and an actuator configured to drive the tool, the control device comprising:
one or more processors configured to:
calculate a depth of a surface of the workpiece based on a depth image captured by the depth camera;
calculate, based on three-dimensional data representing a target shape of the workpiece and a three-dimensional position of the workpiece, a three-dimensional position of the target shape in a case in which the workpiece and the target shape are superimposed;
calculate a depth of a surface of the target shape with respect to the depth camera based on the three-dimensional position of the target shape;
determine a cutting amount at each of a plurality of points on the surface of the workpiece based on a depth difference in a line-of-sight direction between the depth of the surface of the workpiece and the depth of the surface of the target shape in a case in which the workpiece is viewed from a predetermined viewpoint;
match a processing direction of the tool with an imaging direction of the depth camera; and
control the actuator based on the determined cutting amount.

5. A control method for a processing machine including a tool configured to perform machine processing on a workpiece, a depth camera configured to be installed such that the workpiece lies within an imaging range and to capture a depth of a subject, and an actuator configured to drive the tool, the control method comprising:
calculating a depth of a surface of the workpiece based on a depth image captured by the depth camera;
calculating, based on three-dimensional data representing a target shape of the workpiece and a three-dimensional position of the workpiece, a three-dimensional position of the target shape in a case in which the workpiece and the target shape are superimposed;
calculating a depth of a surface of the target shape with respect to the depth camera based on the three-dimensional position of the target shape;
determining a cutting amount at each of a plurality of points on the surface of the workpiece based on a depth difference in a line-of-sight direction between the depth of the surface of the workpiece and the depth of the surface of the target shape in a case in which the workpiece is viewed from a predetermined viewpoint;
matching a processing direction of the tool with an imaging direction of the depth camera; and
controlling the actuator based on the determined cutting amount.

* * * * *